(12) United States Patent
Pospelova et al.

(10) Patent No.: US 10,706,369 B2
(45) Date of Patent: Jul. 7, 2020

(54) VERIFICATION OF INFORMATION OBJECT ATTRIBUTES

(71) Applicant: ABBYY PRODUCTION LLC, Moscow (RU)

(72) Inventors: Anna Pospelova, Moscow (RU); Elmira Rakhmatulina, Saratov (RU)

(73) Assignee: ABBYY Production LLC, Moscow (RU)

( * ) Notice: Subject to any disclaimer, the term of this patent is extended or adjusted under 35 U.S.C. 154(b) by 496 days.

(21) Appl. No.: 15/419,078

(22) Filed: Jan. 30, 2017

(65) Prior Publication Data

US 2018/0181651 A1   Jun. 28, 2018

(30) Foreign Application Priority Data

Dec. 22, 2016   (RU) ................. 2016150632

(51) Int. Cl.
*G06F 16/00* (2019.01)
*G06N 20/00* (2019.01)
(Continued)

(52) U.S. Cl.
CPC ........... *G06N 20/00* (2019.01); *G06F 16/313* (2019.01); *G06F 40/268* (2020.01);
(Continued)

(58) Field of Classification Search
CPC .................................................. G06F 16/2365
See application file for complete search history.

(56) References Cited

U.S. PATENT DOCUMENTS 7,769,579 B2   8/2010   Zhao et al.
8,775,400 B2   7/2014   Ickman et al.
(Continued)

*Primary Examiner* — Hung Q Pham
(74) *Attorney, Agent, or Firm* — Lowenstein Sandler LLP

(57) ABSTRACT

Systems and methods for utilizing user-verified data for training confidence level models. An example method comprises: receiving a first attribute value and a second attribute value associated with an information object representing an entity referenced by a natural language text; receiving a first confidence level associated with the first attribute value and a second confidence level associated with the second attribute value; responsive to determining that the first confidence level falls below a threshold confidence value, displaying the first attribute value using a verification graphical user interface; responsive to receiving, via the verification graphical user interface, a first input verifying the first attribute value, performing at least one of: increasing the first confidence level by a first pre-defined value or setting the first confidence level to a second pre-defined value; displaying the second attribute value using the verification graphical user interface; and responsive to failing to receive, before a triggering event, via the verification graphical user interface, a second input verifying the second attribute value, performing at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

18 Claims, 16 Drawing Sheets

(51) Int. Cl.
  *G06F 16/31*    (2019.01)
  *G06F 40/30*    (2020.01)
  *G06F 40/268*   (2020.01)
  *G06F 40/284*   (2020.01)
  *G06F 40/289*   (2020.01)

(52) U.S. Cl.
  CPC .......... *G06F 40/284* (2020.01); *G06F 40/289* (2020.01); *G06F 40/30* (2020.01)

(56) References Cited

U.S. PATENT DOCUMENTS

| | | |
|---|---|---|
| 8,825,471 B2 | 9/2014 | Betz et al. |
| 9,110,882 B2 | 8/2015 | Overell et al. |
| 2004/0122846 A1 | 6/2004 | Chess et al. |
| 2005/0097019 A1* | 5/2005 | Jacobs ................. G06Q 20/042 705/35 |
| 2006/0115070 A1* | 6/2006 | Bushey ............... H04M 3/5166 379/265.02 |
| 2007/0150800 A1 | 6/2007 | Betz et al. |
| 2008/0235731 A1* | 9/2008 | Bryant ............... H04N 5/44543 725/44 |
| 2008/0256579 A1* | 10/2008 | Verhaegh ........... H04N 5/44513 725/46 |
| 2014/0289177 A1 | 9/2014 | Laroco, Jr. et al. |
| 2014/0372473 A1 | 12/2014 | Betz et al. |
| 2014/0379743 A1 | 12/2014 | Laroco, Jr. et al. |
| 2015/0154193 A1 | 6/2015 | Dave et al. |
| 2015/0356463 A1 | 12/2015 | Overell et al. |

\* cited by examiner

| This | boy | | | smart | , | he' | | succeed | in | life | . |
|---|---|---|---|---|---|---|---|---|---|---|---|
| this <Pronoun, GTNoun, PersonThird> | boy <Noun, Masc, Nominative, GTNoun, Singular> | is <Verb, GTVerb, Singular, PersonThird, ZeroType, Present, Nonnegative, NoCompositeness> | be <Verb, GTVerb, Singular, PersonThird, ZeroType, Present, Nonnegative, Regular, Composite_for_t> | smart <Adjective, DegreePositive, GTAdjectiveAttr, FullComparison> | | he' <Pronoun, Nominative l Accusative, GTNoun, Masculine, Singular, PersonThird, RCPersonal, Unreflexive> | shall <Verb, GTVerbModal, ZeroType, Present, Nonnegative, Composite_ll> | succeed <Verb,GTVerb, NumberZero, PersonZero, ZeroType, TenseZero, Nonnegative> | in <Adverb, GTAdverb> | life <Adjective, DegreePositive, GTAdjectiveAttr> | |
| this <Invariable> | | | | smart <Verb, GTVerb, Singular, PersonFirst l PersonSecond, ZeroType, Present, Nonnegative, NoCompositeness> | | | will <Verb, GTVerbModal, ZeroType, Present, Nonnegative, Irregular, Composite_ll> | succeed <Verb,GTVerb, Singular, PersonFirst l PersonSecond, ZeroType, Present, Nonnegative, NoCompositeness> | in <Preposition> | life <Noun, Nominative l Accusative, GTNoun, Singular> | |
| this <Pronoun, GTAdjectiveAttr, Singular, RCDemonstrative> | | | | smart <Verb, GTVerb, Plural, ZeroType, Present, Nonnegative, NoCompositeness> | | | | succeed <Verb, GTInfinitive, NumberZero, PersonZero, ZeroType, TenseZero, Nonnegative> | | | |
| | | | | smart <Verb, GTInfinitive, NumberZero, ZeroType, TenseZero, Nonnegative> | | | | | | | |
| | | | | smart <Adverb, DegreePositive, GTAdverb, FullComparison> | | | | | | | |
| | | | | smart <Noun, Nominative l Accusative, GTNoun, Singular> | | | | | | | |

Fig. 6

VERIFICATION OF INFORMATION OBJECT ATTRIBUTES

CROSS REFERENCE TO RELATED APPLICATIONS

The present application claims the benefit of priority under 35 USC 119 to Russian Patent Application No. 2016150632, filed Dec. 22, 2016; the disclosure of which is incorporated herein by reference in its entirety for all purposes.

TECHNICAL FIELD

The present disclosure is generally related to computer systems, and is more specifically related to systems and methods for utilizing user-verified data for training confidence level models.

BACKGROUND

Interpreting unstructured or weakly-structured information represented by a natural language text may be hindered by the inherent ambiguity of various natural language constructs. Such ambiguity may be caused, e.g., by polysemy of natural language words and phrases and/or by certain features of natural language mechanisms that are employed for conveying the relationships between words and/or groups of words in a natural language sentence (such as noun cases, order of words, etc).

SUMMARY OF THE DISCLOSURE

In accordance with one or more aspects of the present disclosure, an example method for verification of information object attributes may comprise: receiving a first attribute value and a second attribute value associated with an information object representing an entity referenced by a natural language text; receiving a first confidence level associated with the first attribute value and a second confidence level associated with the second attribute value; responsive to determining that the first confidence level falls below a threshold confidence value, displaying the first attribute value using a verification graphical user interface; responsive to receiving, via the verification graphical user interface, a first input verifying the first attribute value, performing at least one of: increasing the first confidence level by a first pre-defined value or setting the first confidence level to a second pre-defined value; displaying the second attribute value using the verification graphical user interface; and responsive to failing to receive, before a triggering event, via the verification graphical user interface, a second input verifying the second attribute value, performing at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

In accordance with one or more aspects of the present disclosure, an example system for determining confidence levels associated with attribute values of information objects may comprise: a memory and a processor, coupled to the memory, the processor configured to: receive a first attribute value and a second attribute value associated with an information object representing an entity referenced by a natural language text; receive a first confidence level associated with the first attribute value and a second confidence level associated with the second attribute value; responsive to determining that the first confidence level falls below a threshold confidence value, display the first attribute value using a verification graphical user interface; responsive to receiving, via the verification graphical user interface, a first input verifying the first attribute value, perform at least one of: increasing the first confidence level by a first pre-defined value or setting the first confidence level to a second pre-defined value; display the second attribute value using the verification graphical user interface; and responsive to failing to receive, before a triggering event, via the verification graphical user interface, a second input verifying the second attribute value, perform at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

In accordance with one or more aspects of the present disclosure, an example computer-readable non-transitory storage medium may comprise executable instructions that, when executed by a computer system, cause the computer system to: receive a first attribute value and a second attribute value associated with an information object representing an entity referenced by a natural language text; receive a first confidence level associated with the first attribute value and a second confidence level associated with the second attribute value; responsive to determining that the first confidence level falls below a threshold confidence value, display the first attribute value using a verification graphical user interface; responsive to receiving, via the verification graphical user interface, a first input verifying the first attribute value, perform at least one of: increasing the first confidence level by a first pre-defined value or setting the first confidence level to a second pre-defined value; display the second attribute value using the verification graphical user interface; and responsive to failing to receive, before a triggering event, via the verification graphical user interface, a second input verifying the second attribute value, perform at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 6 schematically illustrates an example of a lexico-morphological structure of a sentence, in accordance with one or more aspects of the present disclosure;

DETAILED DESCRIPTION

Figure 1:
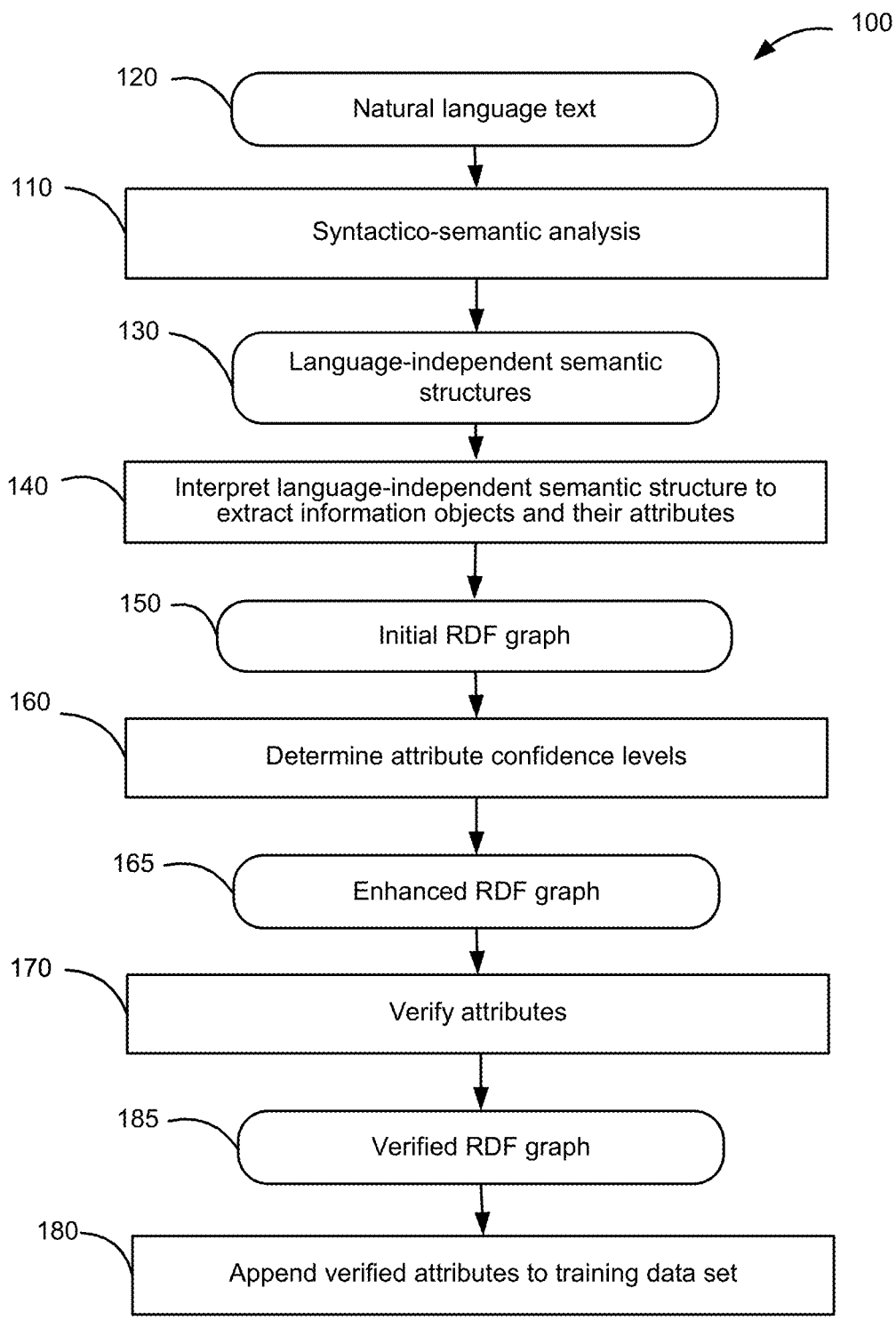
FIG. 1 depicts a flow diagram of one illustrative example of a method for utilizing user-verified data for training confidence level models, in accordance with one or more aspects of the present disclosure.

Described herein are methods and systems for verification of information object attributes.

"Computer system" herein shall refer to a data processing device having a general purpose processor, a memory, and at least one communication interface. Examples of computer systems that may employ the methods described herein include, without limitation, desktop computers, notebook computers, tablet computers, and smart phones.

Information extraction is one of the important operations in automated processing of natural language texts. Information extracted from a natural language document may be represented by one or more data objects comprising definitions of objects, relationships of the objects, and/or statements associated with the objects. Named-entity recognition (NER) (also known as entity identification and entity extraction) is an information extraction task that locates and classifies tokens in a natural language text into pre-defined categories such as names of persons, organizations, locations, expressions of times, quantities, monetary values, percentages, etc.

An information object definition may represent a real life material object (such as a person or a thing) or a certain characteristics associated with one or more real life objects (such as a quantifiable attribute or a quality). An information object may be associated with an ontology concept (also referred to as ontology class or class) which may be linked to a certain semantic class. A plurality of semantic classes may be organized into a hierarchy of semantic classes, instances of which represent information objects and their relationships (e.g., ancestor-descendant hierarchical relationships).

An information object attribute may reflect a property or a characteristic of the information object. Therefore, an information object attribute may be represented by an enumerable attribute or a non-enumerable attribute. At least some of the attributes of an information object may be optional, while some information objects may have at least one required attribute. An information object may have multiple attributes of the same type, while some attribute types may only be represented by a single attribute value for any given information object.

In an illustrative example a property or characteristic reflected by an information object attribute may specify relationships of the information object with one or more other information objects. In various illustrative examples, an information object may have zero, one or multiple relationships with other information objects. Such relationships may include one-to-one, one-to-many, and many-to-many relationships. Certain sequences of related objects may be linear or circular.

In various illustrative examples, an information object attribute may be represented by an enumerable attribute or a non-enumerable attribute. At least some of the attributes of an information object may be optional, while some information objects may have at least one required attribute. An information object may have multiple attributes of the same type, while some attribute types may only be represented by a single attribute value for any given information object.

In an illustrative example, an information object associated with an ontology class "person" may have the following attributes: Name, Date of Birth, Address, and Employment history. The Name attribute may be represented by a character string. The Date of Birth attribute may be represented by a character string, one or more numeric values, or a special data type employed to represent dates. The Address attribute may be represented by a complex attribute referencing the Street, City, State, and Country information objects, and further specifying the street number and optional apartment number of the residential address. The Employment history attribute may by represented by one or more employment records, each employment record referencing an Employer information object and specifying the dates and the position of the employment.

Certain information object relationships may be referred to as "facts." Examples of such relationships include employment of a person X by an organizational entity Y, location of an object X in a geo-location Y, acquiring an organizational entity X by an organizational entity Y, etc. Therefore, a fact may be associated with one or more fact categories. For example, a fact associated with a person may be related to the person's birth, education, occupation, employment, etc. In another example, a fact associated with a business transaction may be related to the type of transaction and the parties to the transaction, the obligations of the parties, the date of signing the agreement, the date of the performance, the payments under the agreement, etc. Fact extraction involves identifying various relationships among the extracted information objects.

Information objects may be associated with portions of the original natural language text from which the respective objects have been extracted. Such associations may be provided, e.g., by textual annotations comprising natural language text sentences or their fragments that have been associated with the extracted information objects. An annotation may be associated with a particular information object or with certain attributes of an information object.

Due to the inherent ambiguity of certain natural language constructs, association of an attribute with an informational object may not always be absolute, and thus may be characterized by a confidence level, which may be expressed by a numeric value on a given scale (e.g., by a real number from a range of 0 to 1). In accordance with one or more aspects of the present disclosure, the confidence level associated with a certain attribute may be determined by evaluating a confidence function associated with production rules that have been employed for producing the attribute. The function domain may be represented by one or more arguments reflecting various aspects of the information extraction process, including identifiers of production rules that have been employed to produce the attribute in question or related attributes, certain features of semantic classes produced by the syntactic and semantic analysis of the sentence referencing the informational object that is characterized by the attribute in question, and/or other features of the information extraction process, as described in more detail herein below.

In certain implementations, the information extraction may involve applying a set of production rules to a plurality of language-independent semantic structures representing the sentences of the natural language text. The computer system may then determine the confidence levels associated with one or more attributes of the informational objects, by evaluating a confidence function associated with the set of production rules.

The confidence function may be represented by a linear classifier producing a distance from the information object to a dividing hyper-plane in a hyperspace of features associated with the set of production rules. Values of the parameters of the linear classifier may be determined by applying machine learning methods. The training data set utilized by the machine learning methods may comprise one or more of natural language texts, in which for certain objects their respective attribute values are specified (e.g., semantic classes or/and ontology classes associated with certain words are marked up in the text). In certain implementations, the training data set may further comprise confidence levels associated with the respective attribute values, so that an attribute value having a higher confidence level would be given a higher weight in determining the classifier parameter values. In certain implementations, the confidence levels of the attributes in the training data set may be validated by the user verification process, as described in more detail herein below. The computer system may utilize the training set to iteratively identify values of the linear classifier parameters that would optimize a chosen objective function (e.g., maximize a fitness function reflecting the number of natural language texts that would be classified correctly using the specified values of the linear classifier parameters).

Thus, the systems and methods described herein represent improvements to the functionality of general purpose or specialized computing devices, by utilizing user-verified information object confidence levels in training data sets that are employed for identifying values of classifier functions that yield confidence level values for information objects and their attributes. Various aspects of the above referenced methods and systems are described in details herein below by way of examples, rather than by way of limitation.

FIG. 1 depicts a flow diagram of one illustrative example of a method 100 for utilizing user-verified data for training confidence level models, in accordance with one or more aspects of the present disclosure. Method 100 and/or each of its individual functions, routines, subroutines, or operations may be performed by one or more processors of the computer system (e.g., computer system 1000 of FIG. 16) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

At block 110, the computer system implementing method 100 may perform syntactico-semantic analysis of an input natural language text 120, which may be represented, e.g., by one or more original documents. The syntactic and sematic analysis may yield one or more language-independent semantic structures 130 representing the sentences of the natural language text, as described in more detail herein above with references to FIGS. 4-14. For simplicity, any subset of a semantic structure shall be referred herein as a "structure" (rather than a "substructure"), unless the parent-child relationship between two semantic structures is at issue.

At block 140, the computer system may interpret the plurality of resulting semantic structures using a set of production rules to extract a plurality of information objects (such as named entities) and their attributes. In certain implementations, the extracted information objects may be associated with semantic classes represented by concepts of a pre-defined or dynamically built ontology.

The production rules employed for interpreting the semantic structures may comprise interpretation rules and identification rules. An interpretation rule may comprise a left-hand side represented by a set of logical expressions defined on one or more semantic structure templates and a right-hand side represented by one or more statements regarding the information objects representing the entities referenced by the natural language text.

A semantic structure template may comprise certain semantic structure elements (e.g., association with a certain lexical/semantic class, association with a certain surface or deep slot, the presence of a certain grammeme or sememe etc.). The relationships between the semantic structure elements may be specified by one or more logical expressions (conjunction, disjunction, and negation) and/or by operations describing mutual positions of nodes within the syntactico-semantic tree. In an illustrative example, such an operation may verify whether one node belongs to a subtree of another node.

Matching the template defined by the left-hand side of a production rule to a semantic structure representing at least part of a sentence of the natural language text may trigger the right-hand side of the production rule. The right-hand side of the production rule may associate one or more attributes with the information objects represented by the nodes. In an illustrative example, the right-hand side of an interpretation rule may comprise a statement associating a token of the natural language text with a category of named entities.

An identification rule may be employed to associate a pair of information objects which represent the same real world entity. An identification rule is a production rule, the left-hand side of which comprises one or more logical expressions referencing the semantic tree nodes corresponding to the information objects. If the pair of information objects satisfies the conditions specified by the logical expressions, the information objects are merged into a single information object.

In certain implementations, the computer system may, upon extracting the information objects from a portion of a natural language text, resolve co-references and anaphoric links between natural text tokens that have been associated with the extracted information objects. "Co-reference" herein shall mean a natural language construct involving two or more natural language tokens that refer to the same entity (e.g., the same person, thing, place, or organization).

While in the illustrative example of FIG. 1 the information objects and their relationships are extracted by interpreting the plurality of semantic structures using a set of production rules, various alternative implementations may employ classifier functions which may, along with lexical and morphological features, utilize syntactic and/or semantic features produced by the syntactico-semantic analysis of the natural language text. In certain implementations, various lexical, grammatical, and or semantic attributes of a natural language token may be fed to one or more classifier functions. Each classifier function may yield a degree of association of the natural language token with a certain category of information objects. In certain implementations, the information object extraction method may employ a combination of production rules and classifier models.

In certain implementations, the computer system may represent the extracted information objects and their relationships by a Resource Definition Framework (RDF) graph 150. The Resource Definition Framework assigns a unique identifier to each information object and stores the information regarding such an object in the form of SPO triplets, where S stands for "subject" and contains the identifier of the object, P stands for "predicate" and identifies some property of the object, and O stands for "object" and stores the value of that property of the object. This value can be either a primitive data type (string, number, Boolean value) or an identifier of another object. In an illustrative example, an SPO triplet may associate a token of the natural language text with a category of named entities.

Referring again to FIG. 1, at block 160, the computer system may determine the confidence levels associated with one or more attributes of the information objects. The confidence levels may be expressed by numeric values on a given scale (e.g., by a real number from a range of 0 to 1). In accordance with one or more aspects of the present disclosure, the confidence level associated with a certain attribute may be determined by evaluating a confidence function associated with the set of production rules. The function domain may be represented by one or more arguments reflecting various aspects of the information extraction process referenced by block 140.

In certain implementations, the computer system may enhance the data objects representing the natural language text (e.g., the data objects represented by the RDF graph 155) by associating the confidence level values with the object attributes, thus producing an enhanced RDF graph 165.

In an illustrative example, the confidence level associated with a given attribute may be affected by the reliability of particular production rules that have been employed to produce the attribute. In an illustrative example, a particular rule may employ a template of a high abstractness level, which may lead to false positive identifications of matching semantic subtrees. For example, a rule may declare all entities associated with child semantic classes of semantic class HUMAN as being directly associated with the ancestor semantic class, and thus may produce a false positive result associating a name of a football team (which is indirectly, via its association with the players on the team, associated with class HUMAN) with the class HUMAN. Thus, the level of confidence associated with a given attribute may be reduced if certain production rules have been employed to produce the attribute. In accordance with one or more aspects of the present disclosure, such production rules and their impact on the attribute confidence level may be identified by employing machine learning methods, as described in more detail herein below.

In another illustrative example, the confidence level associated with a given attribute may be affected by polysemy of certain lexemes found in the natural language text. For example, "serve" is a lexeme that is associated with multiple semantic classes, and the correct semantic disambiguation is not always possible. An incorrect association of a lexeme with a semantic class may lead to false positive identifications of matching semantic subtrees. Thus, the level of confidence associated with a given attribute may be reduced if certain semantic classes, grammemes, sememes, and/or deep or surface positions have been found in the natural language text. In accordance with one or more aspects of the present disclosure, such semantic classes and their impact on the attribute confidence level may be identified by employing machine learning methods, as described in more detail herein below.

In another illustrative example, the same production rule may be applied to either objects of certain semantic classes or their ancestors or descendants (as is the case, for example, in resolving anaphoric constructs). Generally, applying a production rule to an ancestor or a descendant of a specified semantic class, rather than to an object directly associated with the semantic class, produces less reliable results. In accordance with one or more aspects of the present disclosure, such semantic classes and their impact on the attribute confidence level may be identified by employing machine learning methods, as described in more detail herein below.

In another illustrative example, the confidence level associated with a given attribute may be affected by the rating values of one or more language-independent semantic structures that have been produced by the syntactico-semantic analysis of the natural language text. In accordance with one or more aspects of the present disclosure, the impact of low rating values on the attribute confidence level may be identified by employing machine learning methods, as described in more detail herein below.

As noted herein above, the natural language text may comprise multiple references to the same information object, and such reference may employ various lexemes (e.g., referring to a person by the person's full name, first name, and/or position within an organization). One or more identification rules may be applied to these language constructs to merge the referenced information objects. The confidence level associated with a given attribute may be affected by the reliability of particular identification rules that have been employed to produce the attribute. For example, identification rules that compare multiple attributes of the merged objects may produce more reliable results as compared to identification rules that only rely on a lesser number of attributes.

In another illustrative example, the confidence level associated with an attribute of a certain object may be increased by determining that a group of objects, including the object in question and one or more associated objects, share certain attributes. For example, if the word "Apple" is associated with one or more objects related to information technologies, the confidence level of the classifying the word as referencing a company name may be increased.

Figure 2:
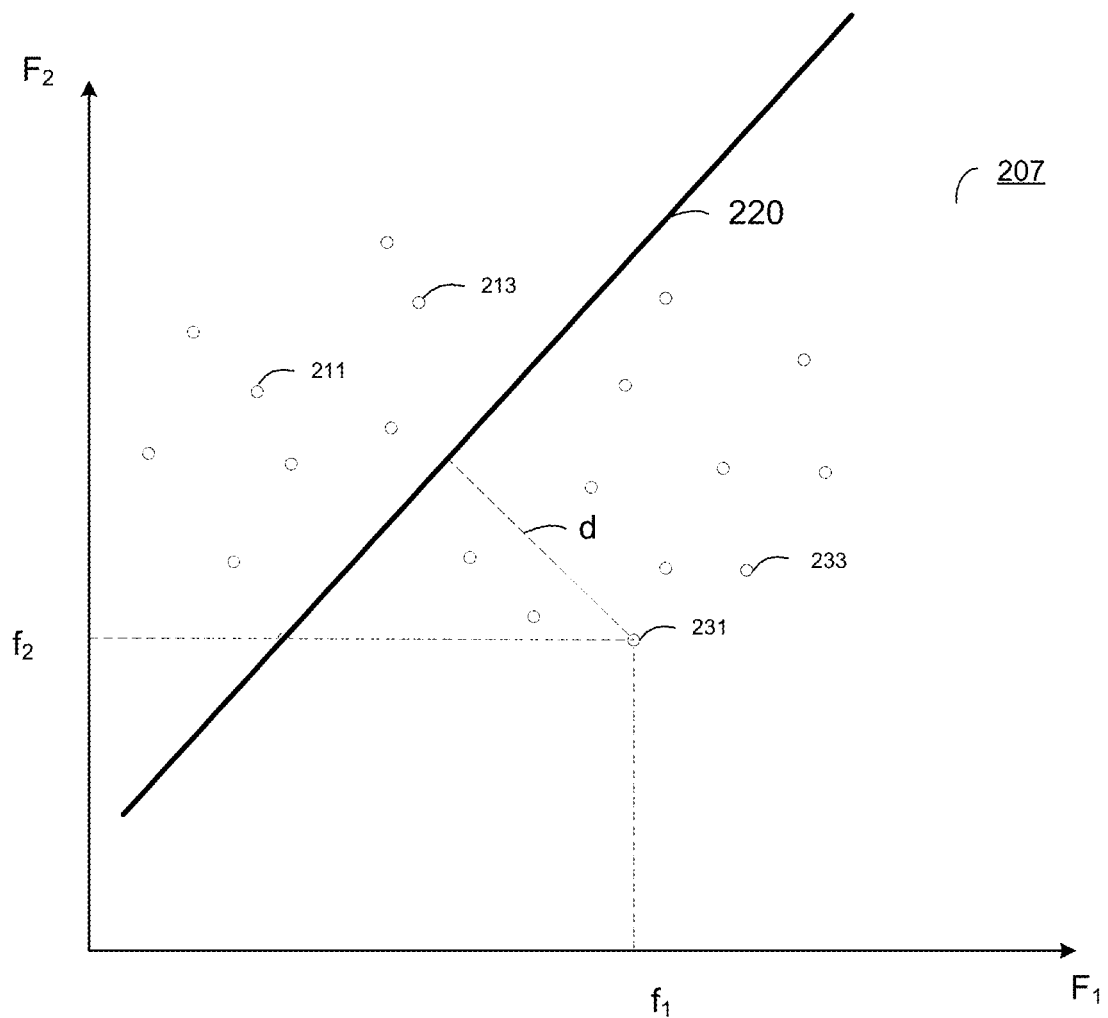
FIG. 2 schematically illustrates a dividing hyper-plane in a hyperspace of features associated with the set of production rules, in accordance with one or more aspects of the present disclosure.

As noted herein above, the confidence level associated with a certain attribute may be determined by evaluating a confidence function associated with the set of production rules. In certain implementations, the confidence function may be represented by a linear classifier producing a distance from the information object to a dividing hyper-plane in a hyperspace of features associated with the set of production rules, as schematically illustrated by FIG. 2. In various illustrative examples, the features may reflect the above-referenced and other aspects of the information extraction process referenced by block 140.

FIG. 2 schematically illustrates an example linear classifier producing a dividing hyper-plane 220 in a two-dimensional hyperspace 207, which may be defined by values of F1 and F2 representing the features associated with the set of production rules. Therefore, each object may be represented by a point in the two-dimensional hyperspace 207, such that the point coordinates represent the values of F1 and F2, respectively. For example, and object having the feature values F1=f1 and F2=f2 may be represented by point 201 having the coordinates of (f1, f2).

The linear classifier may be represented by a function $w^T*x=b$, wherein x is the vector representing the feature values of the object, w is the parameter vector which, together with the value of b, defines the decision boundary. Therefore, an object may be associated with a certain class if $w^T*x>b$, and may be disassociated from that class otherwise. In the illustrative example of FIG. 2, objects 231 and 233 belong to a particular class C, while the objects 211 and 213 do not belong to that class.

Values of the parameters of the linear classifier (e.g., values of w and b) may be determined by applying machine learning methods. The training data set utilized by the machine learning methods may comprise one or more of natural language texts, in which for certain objects their respective attribute values are specified (e.g., semantic classes associated with certain words are marked up in the text). In certain implementations, the training data set may further comprise confidence levels associated with the respective attribute values, so that an attribute value having a higher confidence level would be given a higher weight in determining the classifier parameter values. In certain implementations, the confidence levels of the attributes in the training data set may be validated by the user verification process, as described in more detail herein below. The computer system may utilize the training set to iteratively identify values of the linear classifier parameters that would optimize a chosen objective function (e.g., maximize a fitness function reflecting the number of natural language texts that would be classified correctly using the specified values of the linear classifier parameters).

In accordance with one or more aspects of the present invention, the distance between a particular object and the dividing hyper-plane 220 in hyperspace 207 may be indicative of the confidence level associated with the object attribute that has been identified by the information extraction process referenced by block 140. In certain implementations, the confidence level may be represented by a value of a sigmoid function of the distance between the object and the dividing hyper-plane.

Referring again to FIG. 1, at block 170, the computer system may verify the attribute values via a graphical user interface (GUI) that displays information objects in visual association with their respective properties and textual annotations. The GUI may be employed to receive a user input confirming or modifying certain attribute values associated with extracted information objects.

Figure 3:
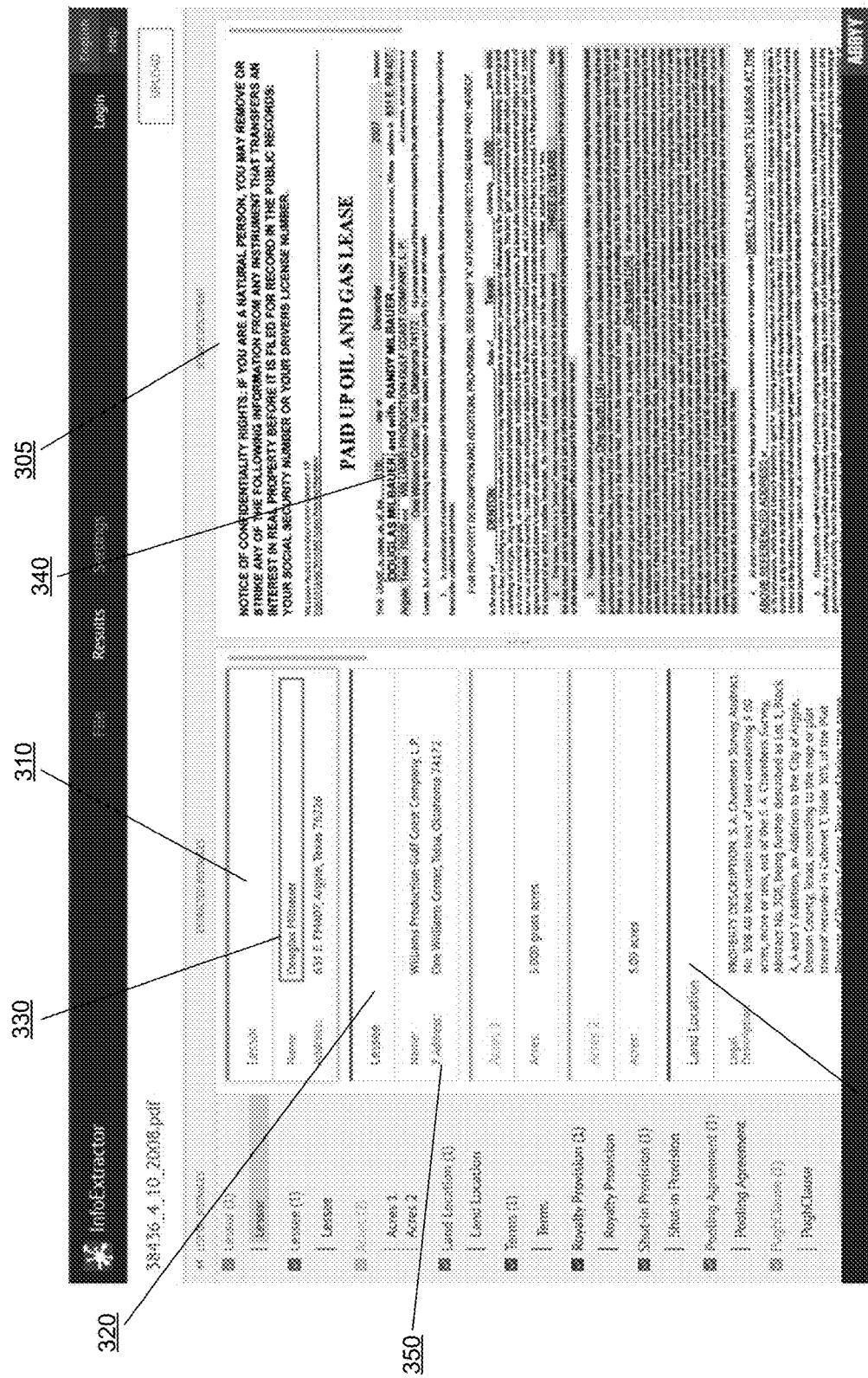
FIG. 3 schematically illustrates a graphical user interface (GUI) employed to receive a user input confirming or modifying attribute values, in accordance with one or more aspects of the present disclosure.

In the illustrative example of FIG. 3, the GUI displays, by the screen panel 305, a fragment of a natural language text, while highlighting annotations and displaying respective information objects and their properties. For example, an information object associated with the class Lessor is represented by the screen panel 310; an information object associated with the class Lessee is represented by the screen panel 320; and an information object associated with the class Land Location is represented by the screen panel 330.

As further shown in FIG. 3, information objects of the classes Lessor and Lessee are each associated with the respective Name and Address properties, which are displayed by screen panels 310 and 320. Visual associations of the information object properties displayed by description panels 310-230 and their respective annotations in the text that is displayed in the panel 305 are facilitated by highlighting both the information object description panel that is currently referenced by the cursor and the associated information object annotation. Thus, in FIG. 3, highlighted are the values "Douglas Milbauer" of the Name attribute 330 of the information object Lessor 7 and the associated annotation 340. The numeric designator (e.g., 7) after the semantic class name is employed to distinguish among the multiple information objects associated with the same semantic class.

In certain implementations, the computer system may utilize the GUI to verify attribute values, the confidence level of which falls below a certain threshold. In an illustrative example, the threshold confidence level that triggers the verification procedure may be user-selectable by a slider GUI control (not shown in FIG. 3 for clarity). Alternatively, the threshold confidence level may be automatically set by the computer system, e.g., at a pre-defined level, and may subsequently be incrementally increased one or more times after receiving the user's indication of the completion of the verification process at the current confidence level. Since the most number of errors would presumably be detected at the lowest confidence levels, the number of errors would decrease as the threshold confidence level increases, and the verification process may be terminated upon establishing that the ratio of the number of errors to the number of correctly determined attributes is reasonably low.

In the illustrative example of FIG. 3, the Address attribute of the information object Lessee, which is displayed by the screen panel 320, is visually associated with a symbol "?" (350) indicating that the confidence level of this attribute falls the threshold value for verification. The GUI may comprise one or more elements that are employed to accept the user's input confirming or rejecting associations of attributes with the respective information objects and/or the values of the attributes associated with the information objects. In an illustrative example, such a GUI element may be represented by check-box, which, if selected by the user, indicates the user's confirmation of the association of the attribute with the information object and/or the value of the attribute associated with the information object. In another illustrative example, the GUI element may be represented by a radio button having "confirm" and "reject" options. In another illustrative example, the GUI element may be represented by a drop-down list displaying various possible values of a certain attribute of the corresponding information object.

In certain implementations, the confidence level of an information object attribute that has been verified by the user through the verification GUI may be increased by a first predefined or dynamically configurable value or set to a second pre-defined or dynamically configurable value (e.g., the maximum confidence level value). The confidence level of an information object attribute that has only been seen by the user (i.e., has been displayed by the verification GUI but no user input was received to confirm, reject or modify the association of the attribute with the corresponding information object or the value of the attribute) may be increased by a third pre-defined or dynamically configurable value which is less than the first pre-defined or dynamically configurable value. Alternatively, the confidence level of an information object attribute that has only been seen by the user (i.e., has been displayed by the verification GUI but no user input was received to confirm, reject or modify the association of the attribute with the corresponding information object or the value of the attribute) may be set to a fourth pre-defined or dynamically configurable value which is less than the second pre-defined or dynamically configurable value.

Referring again to FIG. 1, at block 180, the computer system may append, to the training set that is utilized for determining the values of the parameters of the classifier function that yields the confidence level values, at least part of the natural language text that produced the syntactico-semantic structures from which one or more information objects have been extracted by the operations described herein with reference to block 140. The user-verified attribute values and their respective confidence levels may be also appended to the training data set in association with the respective parts of the natural language text.

The updated confidence level values may thus be taken into account by the machine learning algorithms that determine parameters of the classifier functions that produce the confidence level values, as described in more detail herein above. Therefore, with each new iteration, the classifier accuracy would increase, thus increasing the quality of confidence level estimation.

The computer system may also produce a verified RDF graph 185 representing the natural language text 120. In certain implementations, the resulting RDF graph 185 may also be employed for performing various natural language processing tasks, such as machine translation, semantic search, document classification, etc. Responsive to completing the operations referenced by block 180, the method may terminate.

Figure 4:
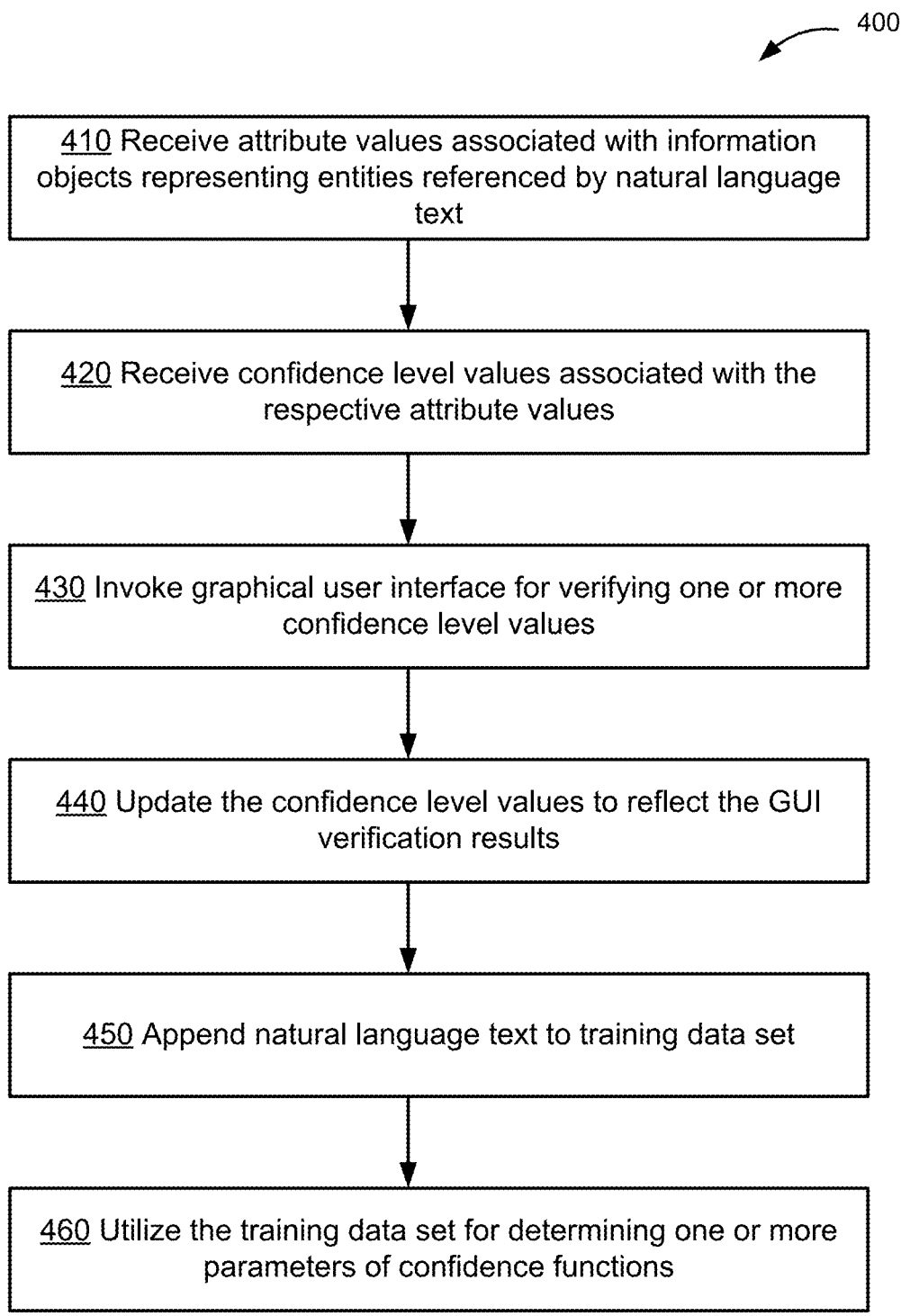
FIG. 4 depicts a flow diagram of one illustrative example of a method for verification of information object attributes that are utilized for training confidence level models, in accordance with one or more aspects of the present disclosure.

FIG. 4 depicts a flow diagram of one illustrative example of a method 400 for verification of information object attributes that are utilized for training confidence level models, in accordance with one or more aspects of the present disclosure. Method 400 and/or each of its individual functions, routines, subroutines, or operations may be performed by one or more processors of the computer system (e.g., computer system 1000 of FIG. 16) implementing the method. In certain implementations, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, the computer system implementing method 100 may receive a plurality of attribute values associated with information objects representing entities referenced by a natural language text 420. In certain implementations, the computer system may extract a plurality of information objects representing entities referenced by the natural language text and determine the attribute values of the extracted information objects by interpreting, using a set of production rules, a plurality of semantic structures representing the natural language text, as described in more detail herein above. In an illustrative example, the plurality of attribute values may include a first attribute value and a second attribute value associated with a certain information object.

At block 420, the computer system may receive confidence level values associated with the respective attribute values. In certain implementations, a confidence level associated with a certain attribute may be determined by evaluating a confidence function associated with the set of production rules. The confidence function may be represented by a linear classifier producing a distance from the information object to a dividing hyper-plane in a hyperspace of features associated with the set of production rules, as described in more detail herein above with reference to FIG. 2. In an illustrative example, computer system may receive a first confidence level associated with the first attribute value and a second confidence level associated with the second attribute value.

At block 430, the computer system may invoke a graphical user interface for verifying one or more confidence level values that fall below a pre-defined or dynamically configurable threshold confidence value. In an illustrative example, the computer system may, responsive to determining that the first confidence level falls below a threshold confidence value, display the first attribute value using the verification graphical user interface. The computer system may further, responsive to determining that the second confidence level falls below the threshold confidence value, display the second attribute value using the verification graphical user interface.

In certain implementations, the verification graphical user interface may display information objects in visual association with their respective properties, attribute values, and textual annotations, and may be employed to receive a user input confirming or modifying certain attribute values associated with extracted information objects. In an illustrative example, the graphical user interface may comprise one or more elements that are employed to accept the user's input confirming or rejecting associations of attributes with the respective information objects and/or the values of the attributes associated with the information objects, as described in more detail herein above with reference to FIG. 3.

At block 440 the computer system may update the confidence level values to reflect the GUI verification results. The confidence level of an information object attribute that has been verified by the user through the verification GUI may be increased by a first pre-defined or dynamically configurable value or set to a second pre-defined or dynamically configurable value (e.g., the maximum confidence level value). The confidence level of an information object attribute that has only been seen by the user (i.e., has been displayed by the verification GUI but no user input was received to confirm, reject or modify the association of the attribute with the corresponding information object or the value of the attribute) may be increased by a third pre-defined or dynamically configurable value which is less than the first configurable value. Alternatively, the confidence level of an information object attribute that has only been seen by the user (i.e., has been displayed by the verification GUI but no user input was received to confirm, reject or modify the association of the attribute with the corresponding information object or the value of the attribute) may be set to a fourth pre-defined or dynamically configurable value which is less than the second configurable value.

In certain implementations, the computer system may determine that a confidence level of an information object attribute has been seen by the user if the attribute value has been displayed via the verification GUI, but no user input was received before a certain triggering event had occurred which indicated that the user terminated the verification session (e.g., by closing the verification GUI window that was displaying the relevant part of the natural language text), navigated away from the relevant part of the natural language text, or a pre-determined or dynamically configurable timeout period associated with displaying the relevant part of the natural language text has expired.

In an illustrative example, the computer system may, responsive to receiving, via the verification graphical user interface, a first input verifying the first attribute value, increasing the first confidence level by a first pre-defined value or set the first confidence level to a second pre-defined value. The computer system may further, responsive to failing to receive, before a triggering event, via the verification graphical user interface, a second input verifying the second attribute value, increase the second confidence level by a third pre-defined value, which is less than the first pre-defined value, or set the second confidence level to a fourth pre-defined value, which is less than the second pre-defined value.

At block 450, the computer system may append, to a training set, at least part of the natural language text that produced the syntactico-semantic structures from which one or more information objects have been extracted. The user-verified attribute values and their respective confidence levels may be also appended to the training data set in association with the respective parts of the natural language text, as described in more detail herein above.

At block 460, the computer system may utilize the training data set for determining one or more parameters of confidence functions that are employed for determining confidence levels of attribute values associated with information objects extracted from natural language texts, as described in more detail herein above. Responsive to completing the operations referenced by block 180, the method may terminate.

Figure 5:
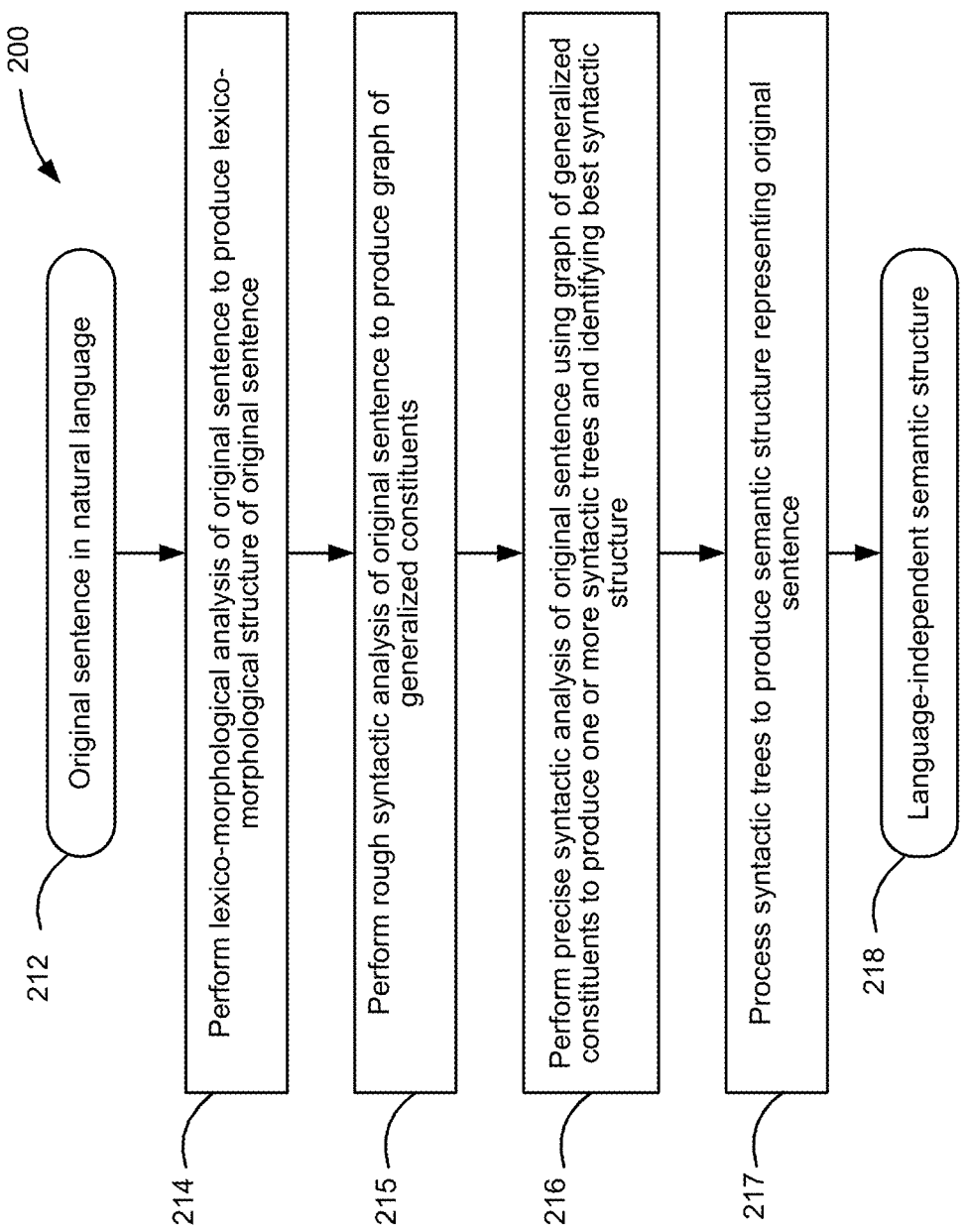
FIG. 5 depicts a flow diagram of one illustrative example of a method for performing a semantico-syntactic analysis of a natural language sentence, in accordance with one or more aspects of the present disclosure.

FIG. 5 depicts a flow diagram of one illustrative example of a method 200 for performing a semantico-syntactic analysis of a natural language sentence 212, in accordance with one or more aspects of the present disclosure. Method 200 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 200 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemma (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more detail herein below with references to FIG. 6.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computer system may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more detail herein below.

FIG. 3 schematically illustrates an example of a lexico-morphological structure of a sentence, in accordance with one or more aspects of the present disclosure. Example lexical-morphological structure 300 may comprise having a plurality of "lexical meaning-grammatical value" pairs for example sentence 320. In an illustrative example, "11" may be associated with lexical meaning "shall" 312 and "will" 314. The grammatical value associated with lexical meaning 312 is <Verb, GTVerbModal, ZeroType, Present, Nonnegative, Composite II>. The grammatical value associated with lexical meaning 314 is <Verb, GTVerbModal, ZeroType, Present, Nonnegative, Irregular, Composite II>.

Figure 7:
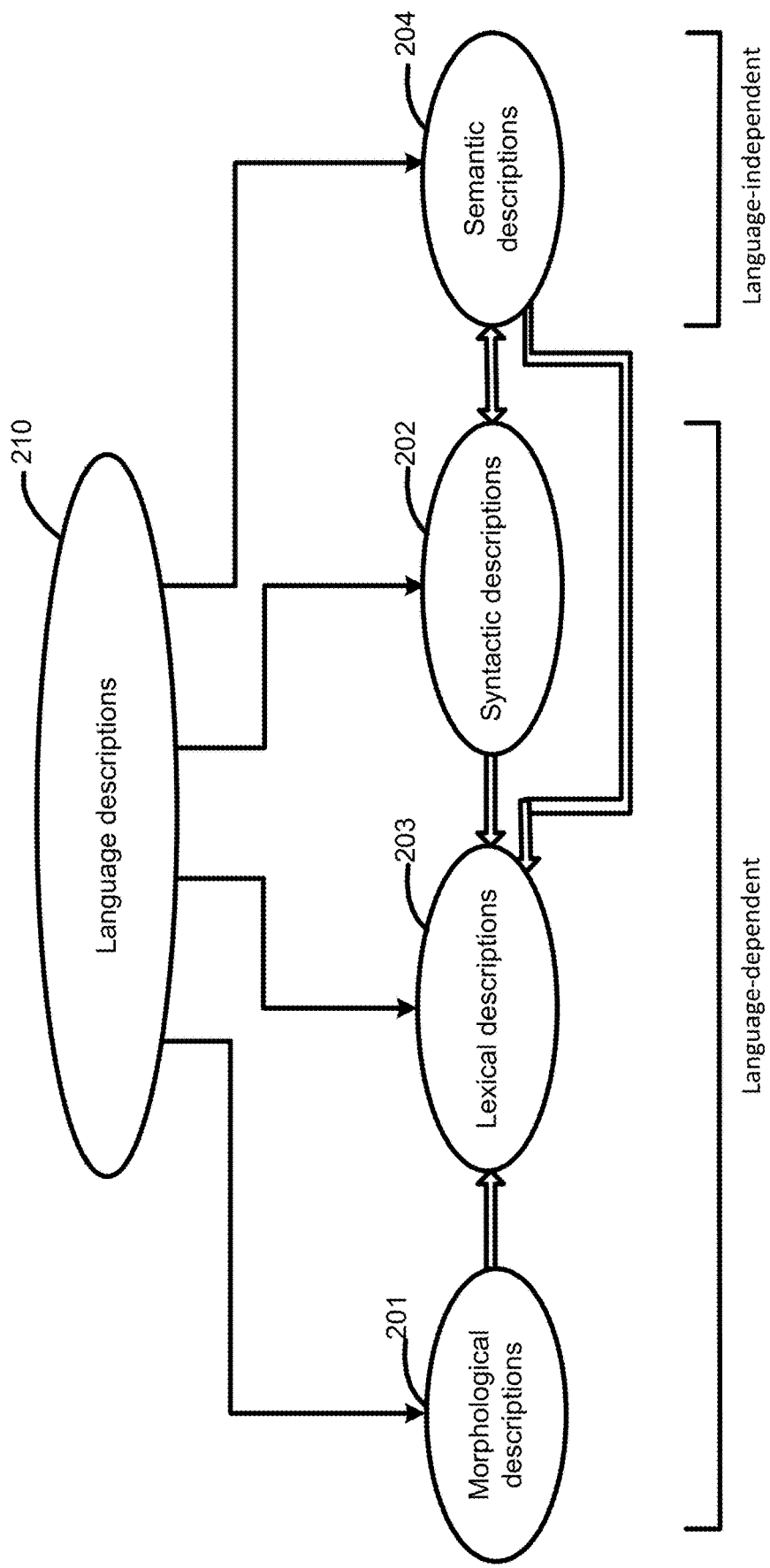
FIG. 7 schematically illustrates language descriptions representing a model of a natural language, in accordance with one or more aspects of the present disclosure.

FIG. 7 schematically illustrates language descriptions 210 including morphological descriptions 201, lexical descriptions 203, syntactic descriptions 202, and semantic descriptions 204, and their relationship thereof. Among them, morphological descriptions 201, lexical descriptions 203, and syntactic descriptions 202 are language-specific. A set of language descriptions 210 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 8:
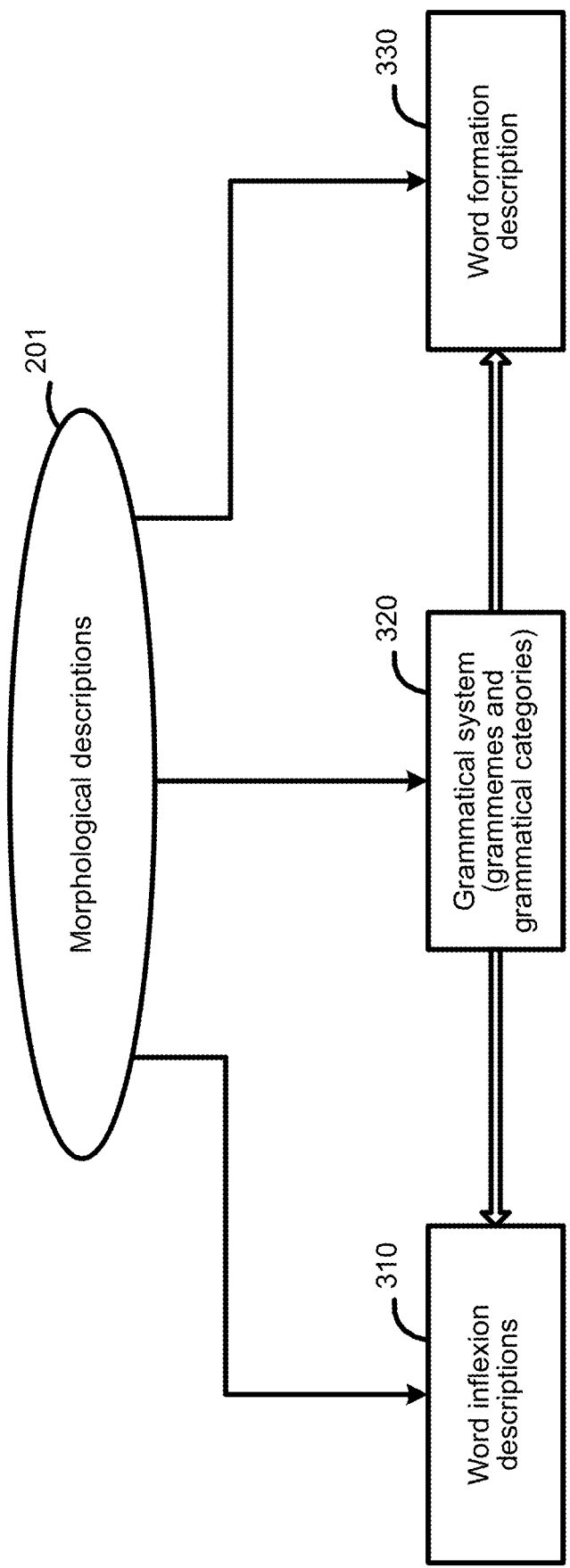
FIG. 8 schematically illustrates examples of morphological descriptions, in accordance with one or more aspects of the present disclosure.

FIG. 8 schematically illustrates several examples of morphological descriptions. Components of the morphological descriptions 201 may include: word inflexion descriptions 310, grammatical system 320, and word formation description 330, among others. Grammatical system 320 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 310 and the word formation description 330.

Word inflexion descriptions 310 describe the forms of a given word depending upon its grammatical categories (e.g., grammatical case, grammatical gender, grammatical number, grammatical tense, etc.), and broadly includes or describes various possible forms of the word. Word formation description 330 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 9:
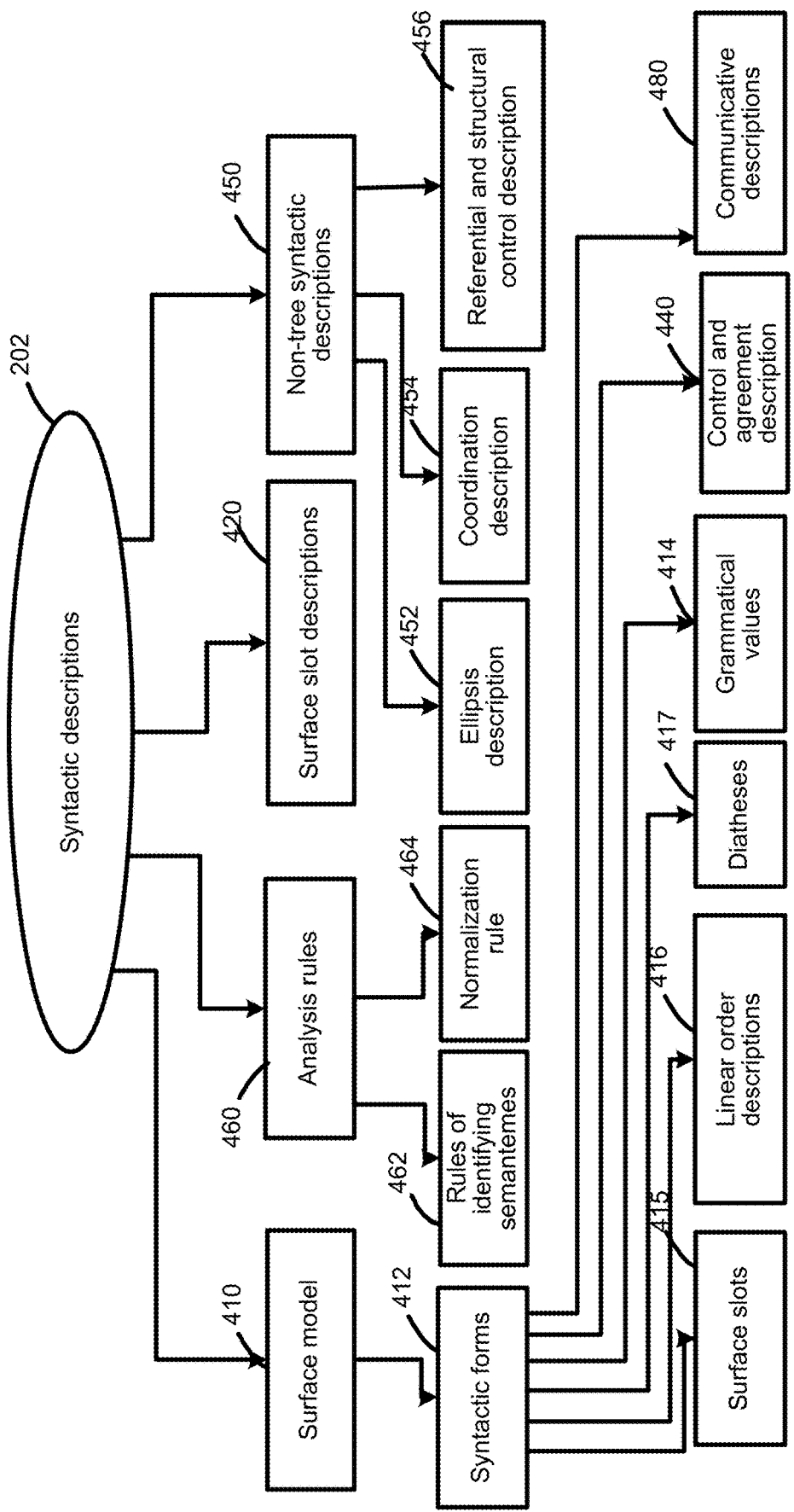
FIG. 9 schematically illustrates examples of syntactic descriptions, in accordance with one or more aspects of the present disclosure.

FIG. 9 illustrates exemplary syntactic descriptions. The components of the syntactic descriptions 202 may include, but are not limited to, surface models 410, surface slot descriptions 420, referential and structural control description 456, control and agreement description 440, non-tree syntactic description 450, and analysis rules 460. Syntactic descriptions 102 may be used to construct possible syntactic structures of the original sentence in a given natural language, taking into account free linear word order, non-tree syntactic phenomena (e.g., coordination, ellipsis, etc.), referential relationships, and other considerations.

Surface models 410 may be represented as aggregates of one or more syntactic forms ("syntforms" 412) employed to describe possible syntactic structures of the sentences that are comprised by syntactic description 102. In general, the lexical meaning of a natural language word may be linked to surface (syntactic) models 410. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 10:
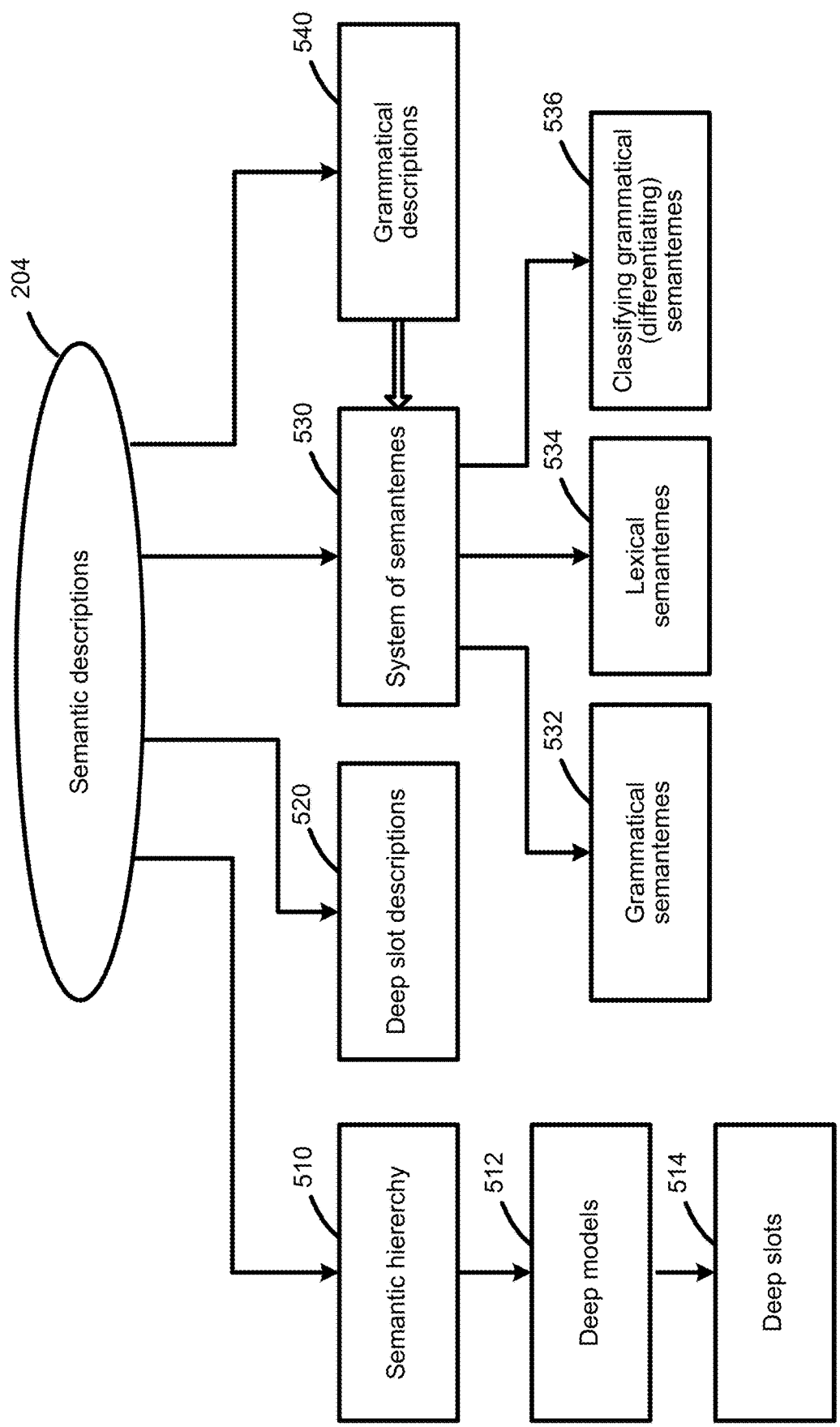
FIG. 10 schematically illustrates examples of semantic descriptions, in accordance with one or more aspects of the present disclosure.

A constituent model may utilize a plurality of surface slots 415 of the child constituents and their linear order descriptions 416 to describe grammatical values 414 of possible fillers of these surface slots. Diatheses 417 may represent relationships between surface slots 415 and deep slots 514 (as shown in FIG. 10). Communicative descriptions 480 describe communicative order in a sentence.

Linear order description 416 may be represented by linear order expressions reflecting the sequence in which various surface slots 415 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object_Direct," where Subject, Core, and Object_Direct are the names of surface slots 415 corresponding to the word order.

Communicative descriptions 480 may describe a word order in a syntform 412 from the point of view of communicative acts that are represented as communicative order expressions, which are similar to linear order expressions. The control and concord description 440 may comprise rules and restrictions which are associated with grammatical values of the related constituents and may be used in performing syntactic analysis.

Non-tree syntax descriptions 450 may be created to reflect various linguistic phenomena, such as ellipsis and coordination, and may be used in syntactic structures transformations which are generated at various stages of the analysis according to one or more aspects of the present disclosure. Non-tree syntax descriptions 450 may include ellipsis description 452, coordination description 454, as well as referential and structural control description 430, among others.

Analysis rules 460 may generally describe properties of a specific language and may be used in performing the semantic analysis. Analysis rules 460 may comprise rules of identifying semantemes 462 and normalization rules 464. Normalization rules 464 may be used for describing language-dependent transformations of semantic structures.

FIG. 10 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent.". In yet another illustrative example, a semantic category "EvaluationObjective" can be used to describe an objective assessment, such as "Bad," "Good," etc.

System of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

Figure 11:
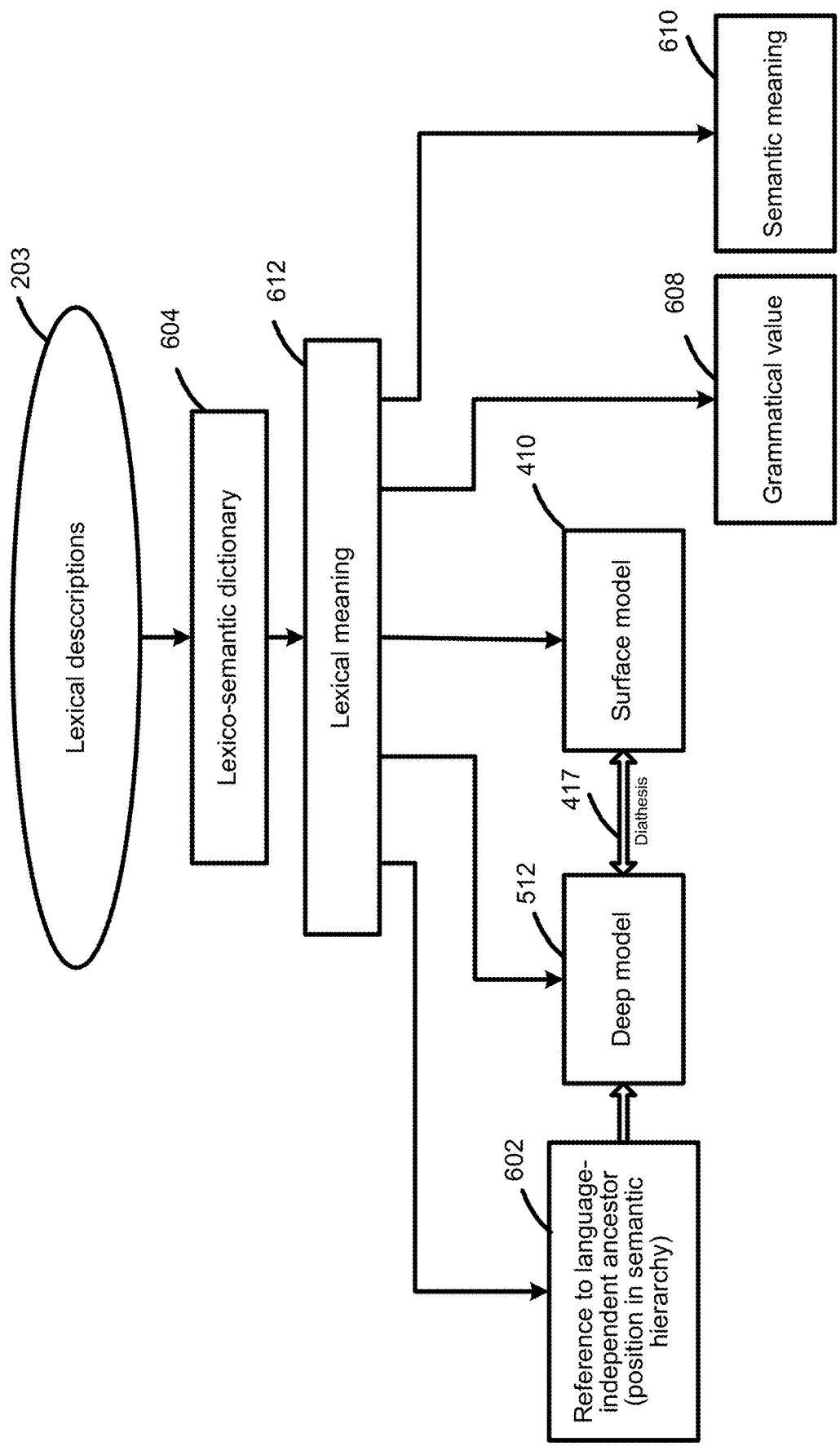
FIG. 11 schematically illustrates examples of lexical descriptions, in accordance with one or more aspects of the present disclosure.

FIG. 11 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 410 which, in turn, may be associated, by one or more diatheses 417, with a corresponding deep model 512. A lexical meaning 612 may inherit the semantic class of its parent, and may further specify its deep model 152.

A surface model 410 of a lexical meaning may comprise includes one or more syntforms 412. A syntform, 412 of a surface model 410 may comprise one or more surface slots 415, including their respective linear order descriptions 416, one or more grammatical values 414 expressed as a set of grammatical categories (grammemes), one or more semantic restrictions associated with surface slot fillers, and one or more of the diatheses 417. Semantic restrictions associated with a certain surface slot filler may be represented by one or more semantic classes, whose objects can fill the surface slot.

Figure 12:
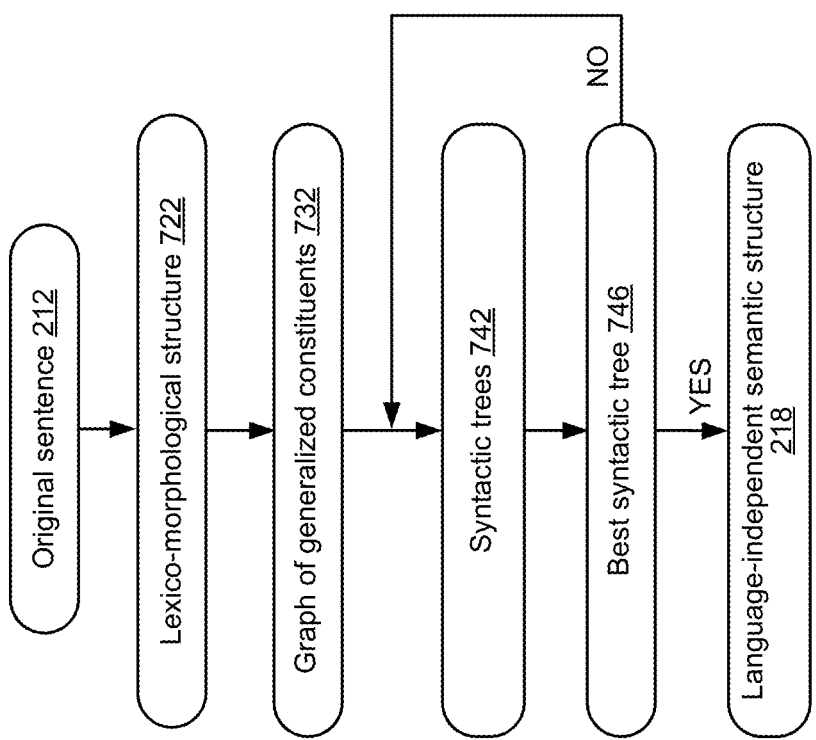
FIG. 12 schematically illustrates example data structures that may be employed by one or more methods implemented in accordance with one or more aspects of the present disclosure.

FIG. 12 schematically illustrates example data structures that may be employed by one or more methods described herein. Referring again to FIG. 5, at block 214, the computer system implementing the method may perform lexico-morphological analysis of sentence 212 to produce a lexico-morphological structure 722 of FIG. 12. Lexico-morphological structure 722 may comprise a plurality of mapping of a lexical meaning to a grammatical value for each lexical unit (e.g., word) of the original sentence. FIG. 3 schematically illustrates an example of a lexico-morphological structure.

Referring again to FIG. 5, at block 215, the computer system may perform a rough syntactic analysis of original sentence 212, in order to produce a graph of generalized constituents 732 of FIG. 12. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 415 of a plurality of parent constituents in order to reflect all lexical units of original sentence 212.

Figure 13:
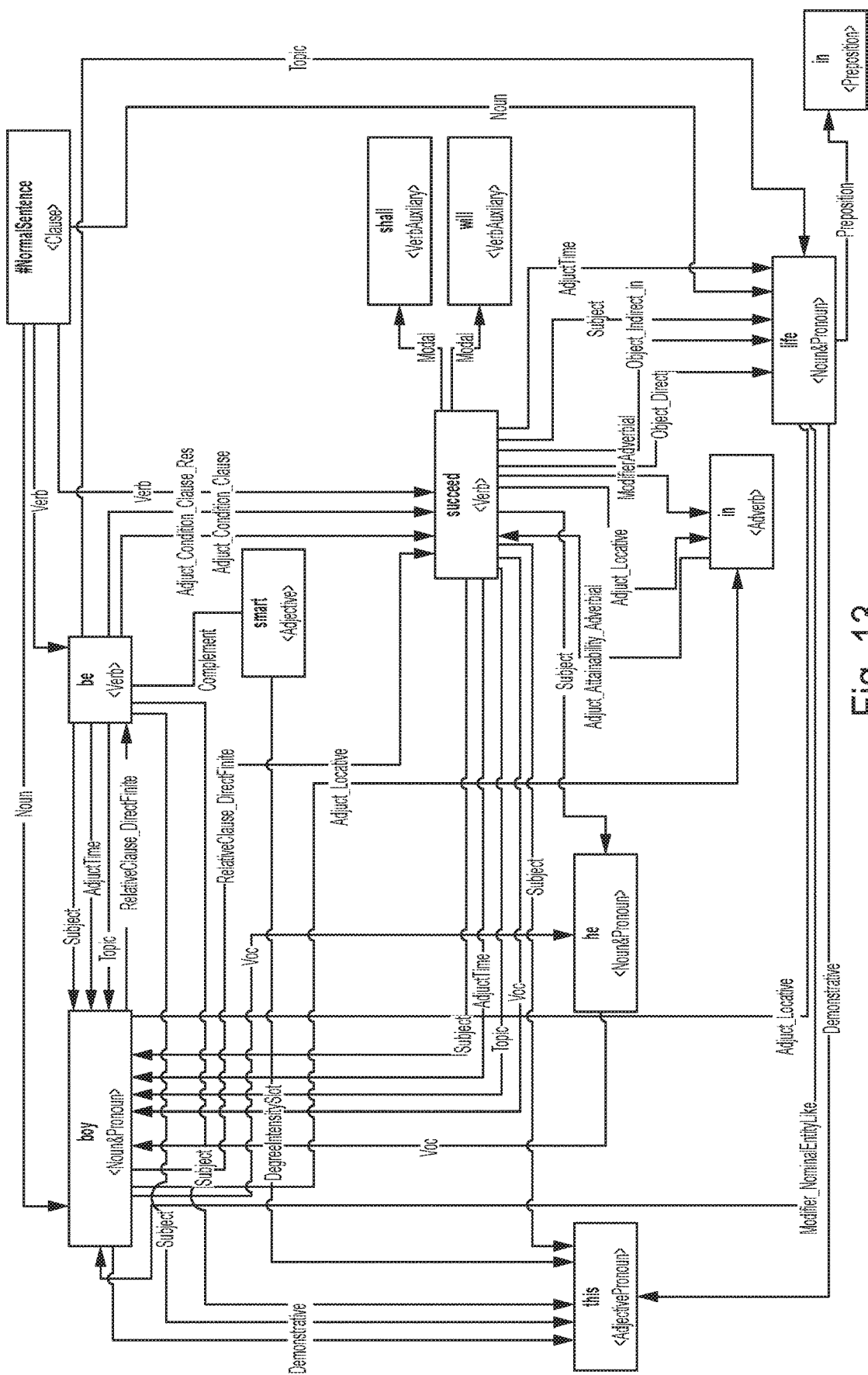
FIG. 13 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 414, e.g., based on part of speech designations and their relationships. FIG. 13 schematically illustrates an example graph of generalized constituents.

At block 216, the computer system may perform a precise syntactic analysis of sentence 212, to produce one or more syntactic trees 742 of FIG. 12 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure 746 based on the selected syntactic tree, the computer system may establish one or more non-tree links (e.g., by producing redundant path between at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values 240 of original sentence 212.

At block 217, the computer system may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 460, and may involve associating, one or more attributes (reflecting lexical, syntactic, and/or semantic properties of the words of original sentence 212) with each semantic class.

Figure 14:
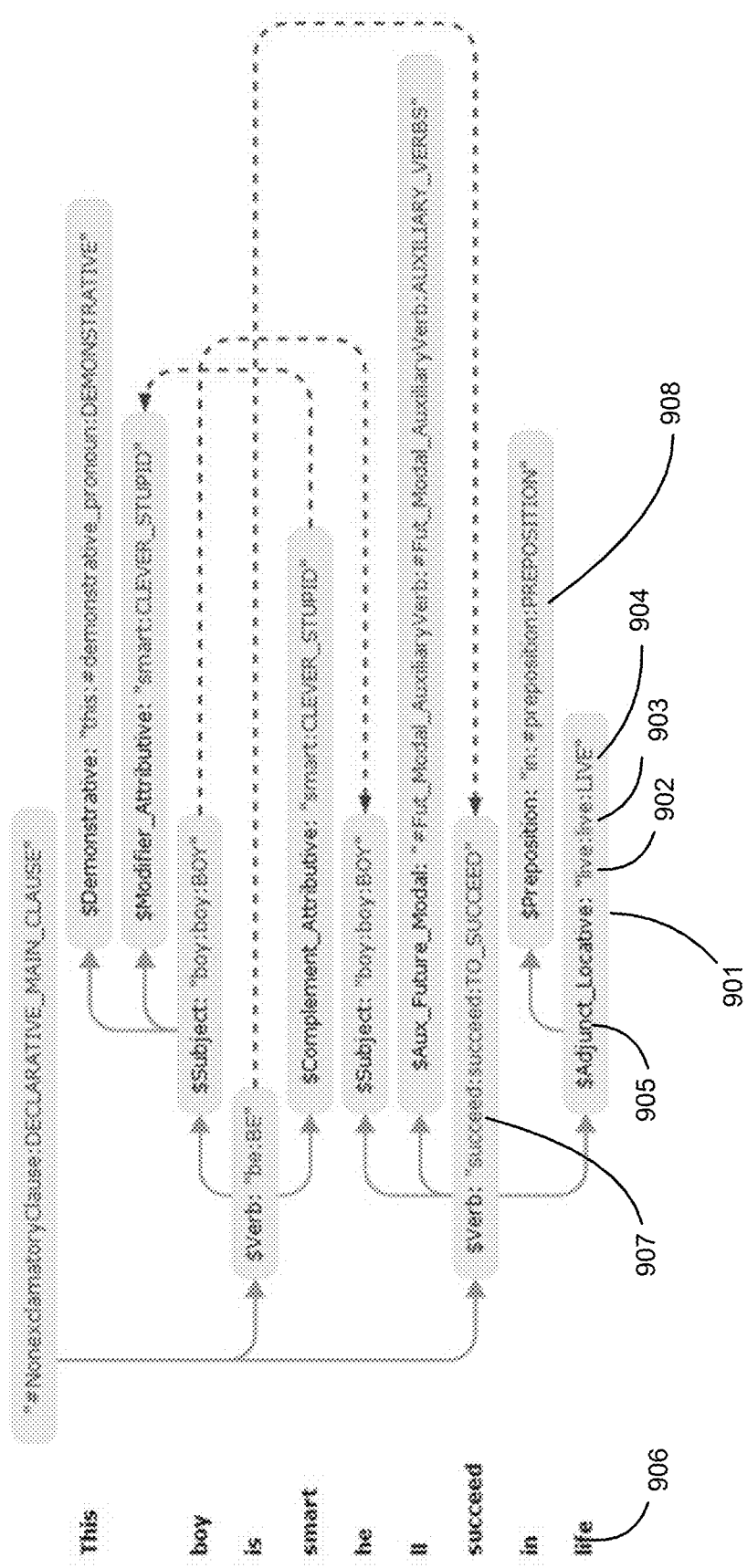
FIG. 14 illustrates an example syntactic structure corresponding to the sentence illustrated by FIG. 13.

FIG. 14 illustrates an example syntactic structure of a sentence derived from the graph of generalized constituents illustrated by FIG. 13. Node 901 corresponds to the lexical element "life" 906 in original sentence 212. By applying the method of syntactico-semantic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 15:
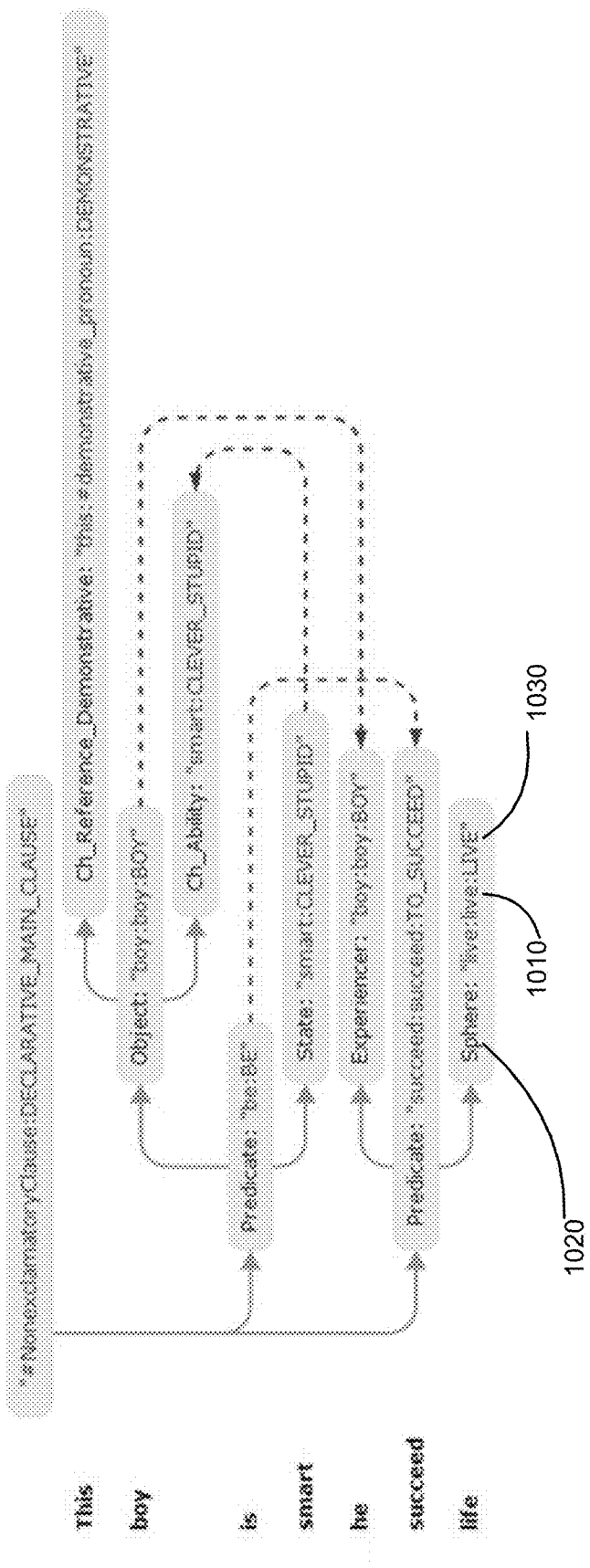
FIG. 15 illustrates a semantic structure corresponding to the syntactic structure of FIG. 14.

FIG. 15 illustrates a semantic structure corresponding to the syntactic structure of FIG. 14. With respect to the above referenced lexical element "life" 906 of FIG. 14, the semantic structure comprises lexical class 1010 and semantic classes 1030 similar to those of FIG. 14, but instead of surface slot 905, the semantic structure comprises a deep slot "Sphere" 1020.

As noted herein above, and ontology may be provided by a model representing objects pertaining to a certain branch of knowledge (subject area) and relationships among such objects. Thus, an ontology is different from a semantic hierarchy, despite the fact that it may be associated with elements of a semantic hierarchy by certain relationships (also referred to as "anchors"). An ontology may comprise definitions of a plurality of classes, such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more detail herein. The index may be employed in various natural language processing tasks, including the task of performing semantic search.

The computer system implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the syntactic and semantic structures produced by one or more text analysis methods described herein, for employing those structures and/or indexes in semantic search, classification, clustering, and document filtering.

Figure 16:
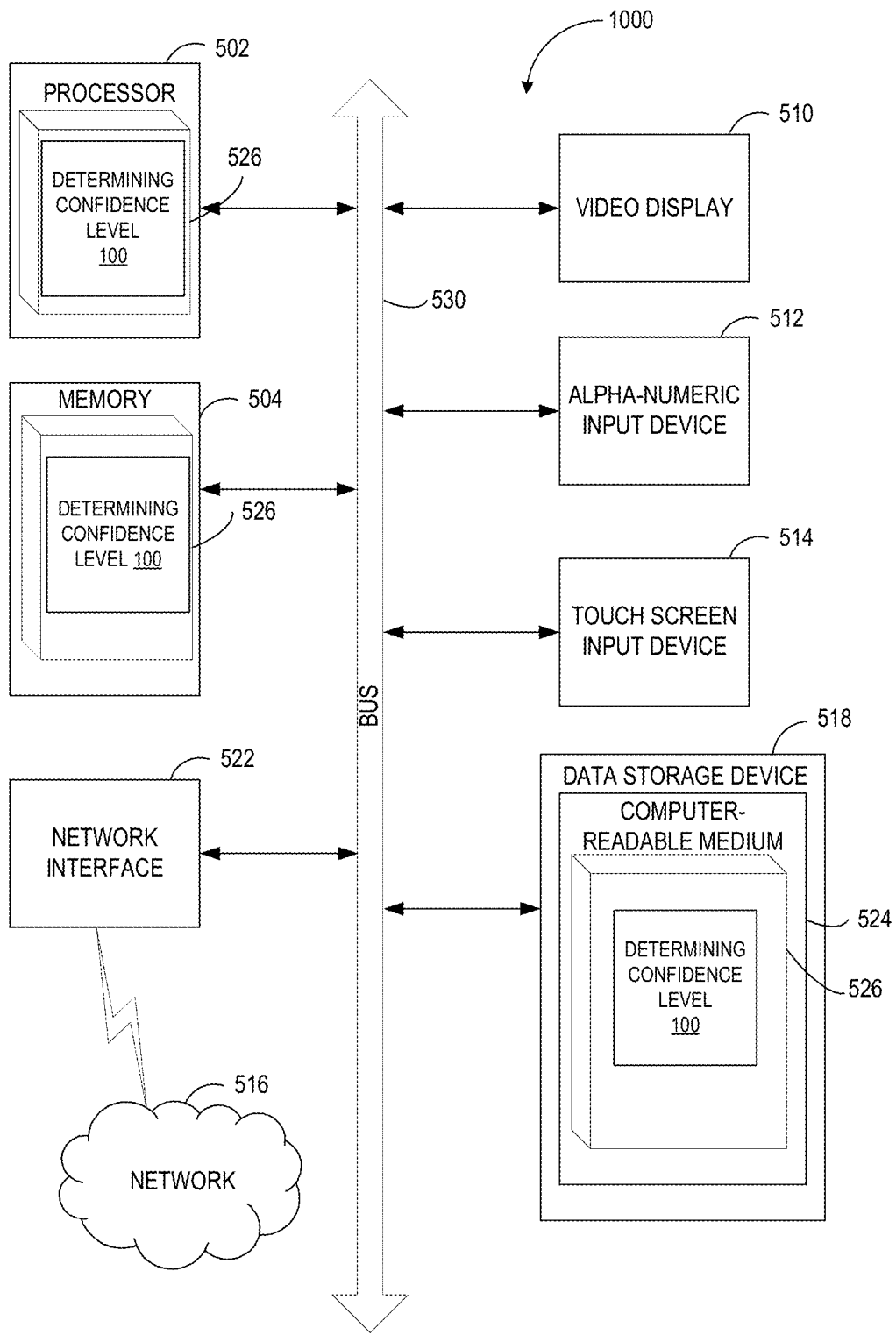
FIG. 16 depicts a diagram of an example computer system implementing the methods described herein.

FIG. 16 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of method 100 for utilizing user-verified data for training confidence level models and/or method 400 for verification of information object attributes that are utilized for training confidence level models, in accordance with one or more aspects of the present disclosure. While computer-readable storage medium 524 is shown in the example of FIG. 16 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
receiving, by a processing device, a first attribute value and a second attribute value associated with an information object representing an entity referenced by a natural language text;
evaluating a confidence function to determine a first confidence level associated with the first attribute value and a second confidence level associated with the second attribute value, wherein the confidence function is associated with a set of production rules, wherein the first attribute value and the second attribute value are produced by the set of production rules;
responsive to determining that the first confidence level falls below a threshold confidence value, displaying the first attribute value using a verification graphical user interface;
responsive to receiving, via the verification graphical user interface, a first input confirming the first attribute value, performing at least one of: increasing the first confidence level by a first pre-defined value or setting the first confidence level to a second pre-defined value;
displaying the second attribute value using the verification graphical user interface; and
responsive to failing to receive, before a triggering event, via the verification graphical user interface, a second input verifying the second attribute value, performing at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

2. The method of claim 1, wherein the triggering event is provided by expiration of a certain timeout that has been initialized by displaying the second attribute value.

3. The method of claim 1, wherein the triggering event is provided by receiving a third user input causing the verification graphical user interface to cease displaying the second attribute value.

4. The method of claim 1, wherein the triggering event is provided by receiving, after displaying the second attribute value, a fourth user input causing the verification graphical user interface to terminate.

5. The method of claim 1, further comprising:
appending, to a training data set, at least part of the natural language text referencing the information object, the first attribute value, and the first confidence level.

6. The method of claim 5, further comprising:
determining, using the training data set, at least one parameter of the confidence function.

7. The method of claim 1, wherein receiving the attribute value further comprises:
interpreting, using a set of production rules, a plurality of semantic structures to extract a plurality of information objects representing entities referenced by the natural language text.

8. The method of claim 1, wherein the first input verifying the first attribute value confirms the first attribute value.

9. The method of claim 1, wherein the first input verifying the first attribute value modifies the first attribute value.

10. A system, comprising:
a memory;
a processor, coupled to the memory, the processor configured to:
receive a first attribute value and a second attribute value associated with an information object representing an entity referenced by a natural language text;
evaluate a confidence function to determine a first confidence level associated with the first attribute value and a second confidence level associated with the second attribute value, wherein the confidence function is associated with a set of production rules, wherein the first attribute value and the second attribute value are produced by the set of production rules;
responsive to determining that the first confidence level falls below a threshold confidence value, display the first attribute value using a verification graphical user interface;
responsive to receiving, via the verification graphical user interface, a first input confirming the first attribute value, perform at least one of: increasing the first confidence level by a first pre-defined value or setting the first confidence level to a second pre-defined value;
display the second attribute value using the verification graphical user interface; and
responsive to failing to receive, before a triggering event, via the verification graphical user interface, a second input verifying the second attribute value, perform at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

11. The system of claim 10, wherein the processor is further configured to:
appending, to a training data set, at least part of the natural language text referencing the information object, the first attribute value, and the first confidence level.

12. The method of claim 11, wherein the processor is further configured to:
determining, using the training data set, at least one parameter of the confidence function.

13. The system of claim 10, wherein receiving the attribute value further comprises:
interpreting, using a set of production rules, a plurality of semantic structures to extract a plurality of information objects representing entities referenced by the natural language text.

14. The system of claim 10, wherein the triggering event is provided by one of: expiration of a certain timeout that has been initialized by displaying the second attribute value, receiving a third user input causing the verification graphical user interface to cease displaying the second attribute value, or receiving, after displaying the second attribute value, a fourth user input causing the verification graphical user interface to terminate.

15. A computer-readable non-transitory storage medium comprising executable instructions that, when executed by a computer system, cause the computer system to:
   receive a first attribute value and a second attribute value associated with an information object representing an entity referenced by a natural language text;
   evaluate a confidence function to determine a first confidence level associated with the first attribute value and a second confidence level associated with the second attribute value, wherein the confidence function is associated with a set of production rules, wherein the first attribute value and the second attribute value are produced by the set of production rules;
   responsive to determining that the first confidence level falls below a threshold confidence value, display the first attribute value using a verification graphical user interface;
   responsive to receiving, via the verification graphical user interface, a first input confirming the first attribute value, perform at least one of: increasing the first confidence level by a first pre-defined value or setting the first confidence level to a second pre-defined value;
   display the second attribute value using the verification graphical user interface; and
   responsive to failing to receive, before a triggering event, via the verification graphical user interface, a second input verifying the second attribute value, perform at least one of: increasing the second confidence level by a third pre-defined value or setting the second confidence level to a fourth pre-defined value, wherein the third pre-defined value is less than the first pre-defined value and the fourth pre-defined value is less than the second pre-defined value.

16. The computer-readable non-transitory storage medium of claim 15, further comprising causing the computer system to:
   append, to a training data set, at least part of the natural language text referencing the information object, the first attribute value, and the first confidence level.

17. The computer-readable non-transitory storage medium of claim 16, further comprising executable instructions causing the computer system to:
   determine, using the training data set, at least one parameter of the first confidence function.

18. The computer-readable non-transitory storage medium of claim 16, wherein receiving the attribute value further comprises:
   interpreting, using a set of production rules, a plurality of semantic structures to extract a plurality of information objects representing entities referenced by the natural language text.

* * * * *